Figure 5:
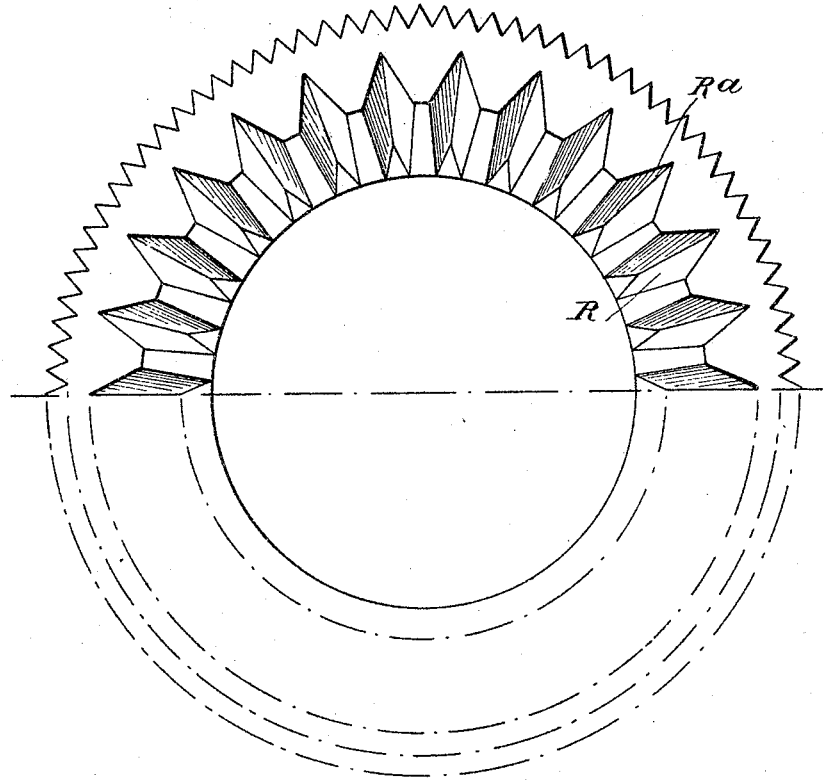

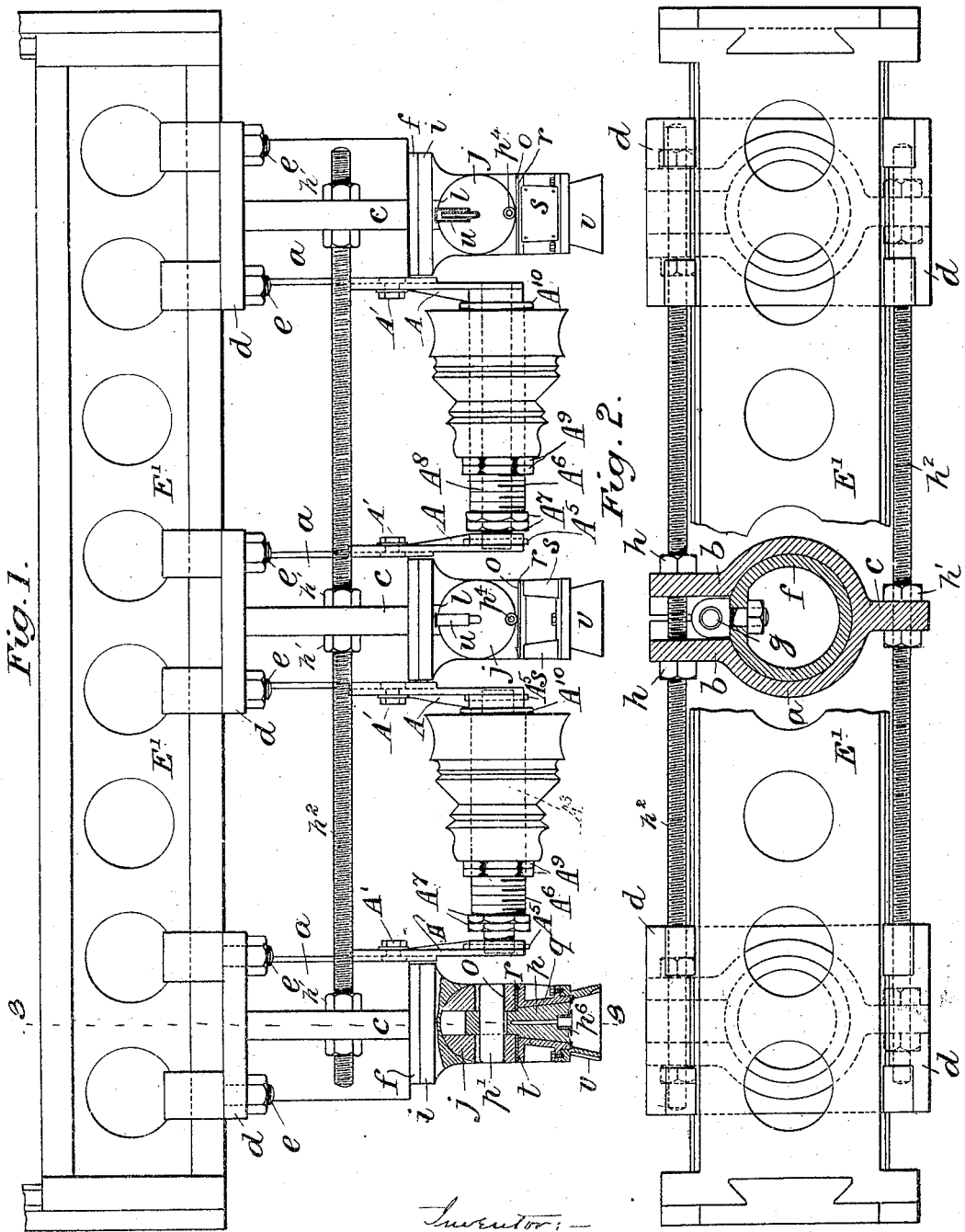

No. 775,455. PATENTED NOV. 22, 1904.
F. M. McLARTY.
MEANS AND APPARATUS FOR USE IN CUTTING OR DRESSING OR POLISHING STONE OR OTHER MATERIAL.
APPLICATION FILED APR. 10, 1901.
NO MODEL. 7 SHEETS—SHEET 2.
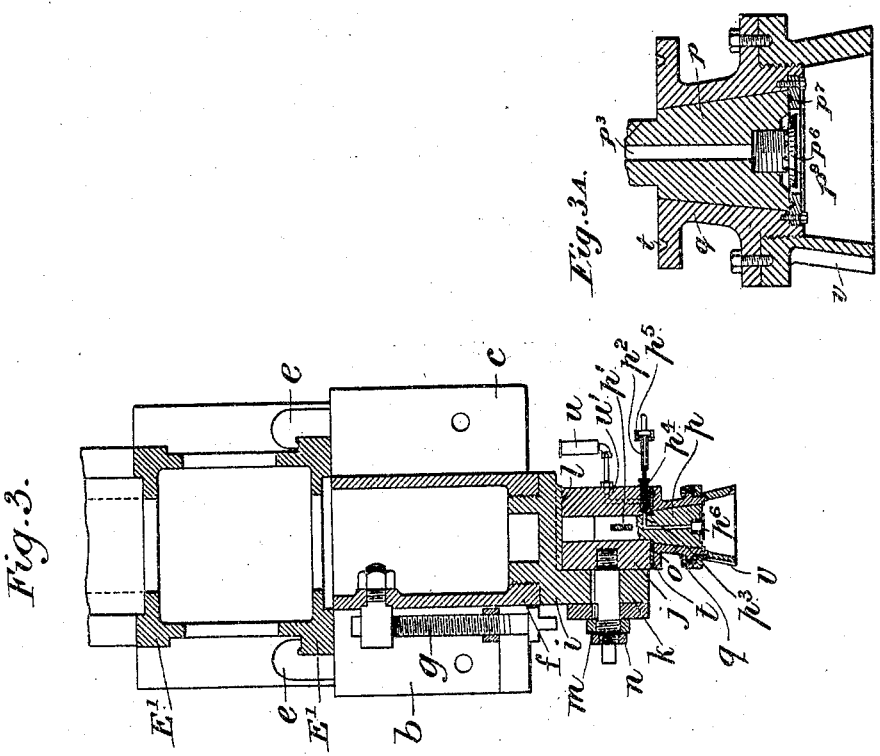

No. 775,455. PATENTED NOV. 22, 1904.
F. M. McLARTY.
MEANS AND APPARATUS FOR USE IN CUTTING OR DRESSING OR POLISHING STONE OR OTHER MATERIAL.
APPLICATION FILED APR. 10, 1901.
NO MODEL. 7 SHEETS—SHEET 3.
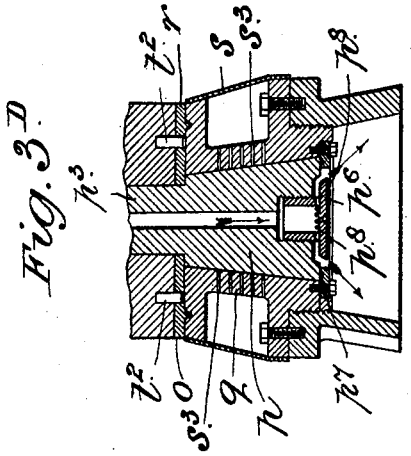
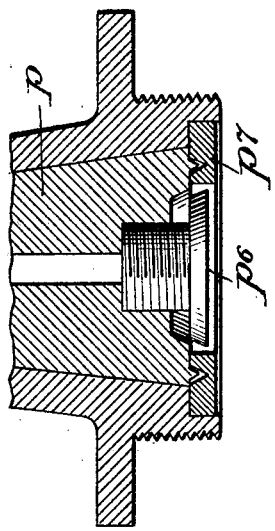
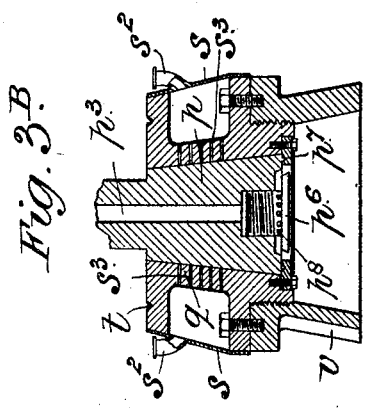
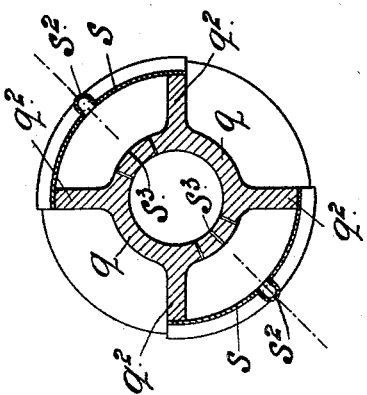

No. 775,455. PATENTED NOV. 22, 1904.
F. M. McLARTY.
MEANS AND APPARATUS FOR USE IN CUTTING OR DRESSING OR POLISHING STONE OR OTHER MATERIAL.
APPLICATION FILED APR. 10, 1901.
NO MODEL. 7 SHEETS—SHEET 4.

No. 775,455. PATENTED NOV. 22, 1904.
F. M. McLARTY.
MEANS AND APPARATUS FOR USE IN CUTTING OR DRESSING OR POLISHING STONE OR OTHER MATERIAL.
APPLICATION FILED APR. 10, 1901.

NO MODEL. 7 SHEETS—SHEET 5.

No. 775,455. PATENTED NOV. 22, 1904.
F. M. McLARTY.
MEANS AND APPARATUS FOR USE IN CUTTING OR DRESSING OR POLISHING STONE OR OTHER MATERIAL.
APPLICATION FILED APR. 10, 1901.
NO MODEL. 7 SHEETS—SHEET 6.

No. 775,455. PATENTED NOV. 22, 1904.
F. M. McLARTY.
MEANS AND APPARATUS FOR USE IN CUTTING OR DRESSING OR POLISHING STONE OR OTHER MATERIAL.
APPLICATION FILED APR. 10, 1901.
NO MODEL. 7 SHEETS—SHEET 7.

No. 775,455. Patented November 22, 1904.

UNITED STATES PATENT OFFICE.

FARQUHAR MATHESON McLARTY, OF GREENOCK, SCOTLAND.

MEANS AND APPARATUS FOR USE IN CUTTING OR DRESSING OR POLISHING STONE OR OTHER MATERIAL.

SPECIFICATION forming part of Letters Patent No. 775,455, dated November 22, 1904.

Application filed April 10, 1901. Serial No. 55,195. (No model.)

*To all whom it may concern:*

Be it known that I, FARQUHAR MATHESON McLARTY, a subject of the King of Great Britain and Ireland, residing at 52 Forsyth street, Greenock, Scotland, have invented certain new and useful Improvements in Means and Apparatus for Use in Cutting or Dressing or Polishing Stone or other Material; and I do hereby declare the following to be a full, clear, and exact description of the invention, such as will enable others skilled in the art to which it appertains to make and use the same.

My invention has for its object to provide apparatus whereby stone or the like can be rapidly, economically, and accurately cut or dressed, as hereinafter described.

The improvements according to this invention include cutters so adapted and applied as to maintain an even or practically even temperature at the working faces and prevent injurious expansion and contraction and also prevent the admission of grit between surfaces moving in contact and clear grit out of the cutter's path, the arrangement being such that the position of the cutters and their direction of action can be rapidly changed and their angle of action can be altered as may be required and one cutter or set of cutters be readily changed for another cutter or set of cutters, the cutters be accurately adjusted and secured for different kinds of work, and the parts that move in contact be properly lubricated.

Figure 4:
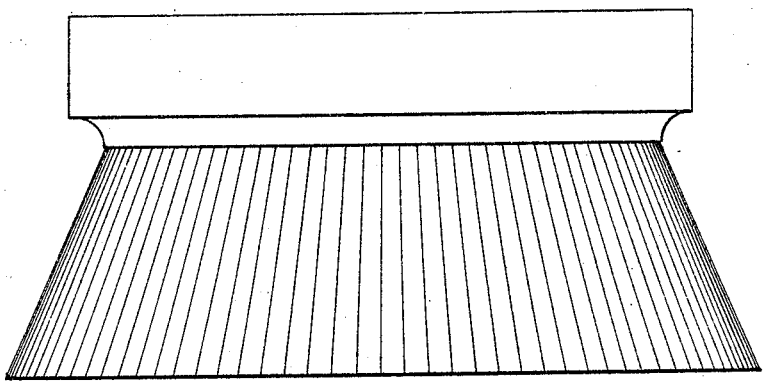
Figure 7:
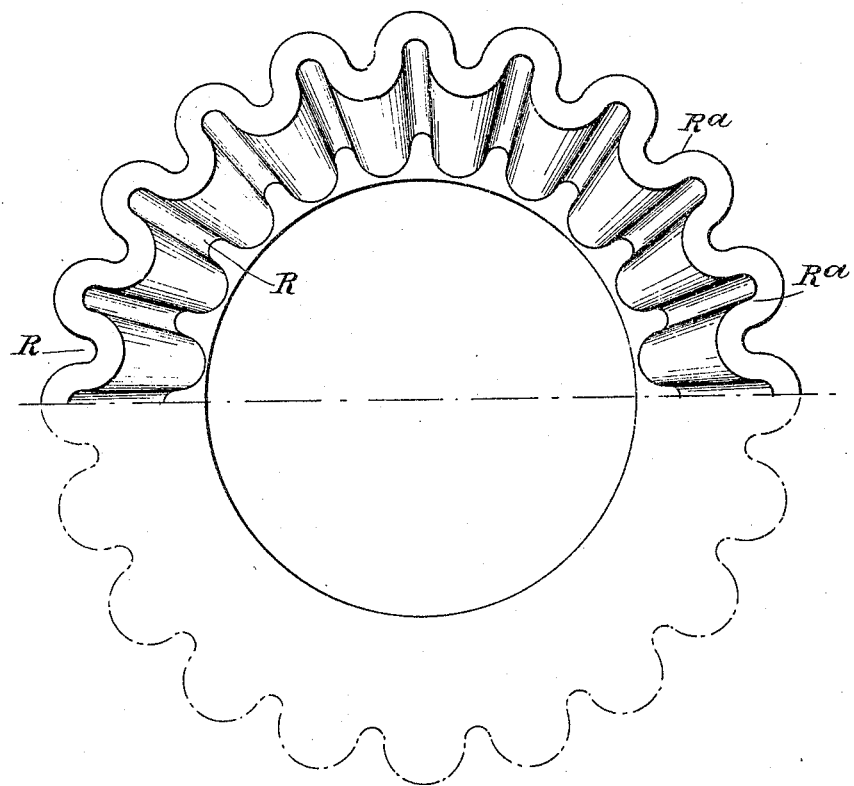
Figure 6:
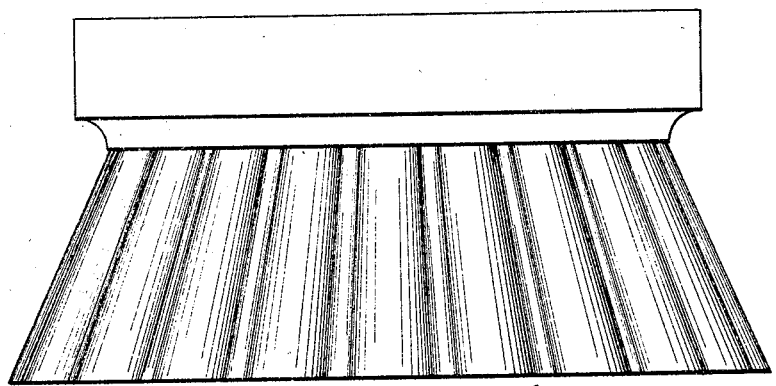
Figure 9:
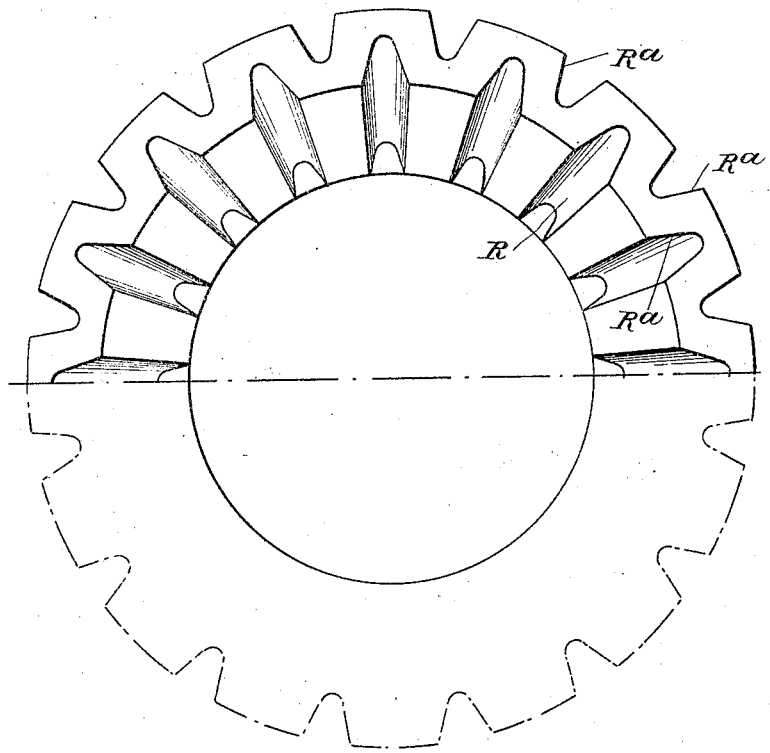
Figure 8:
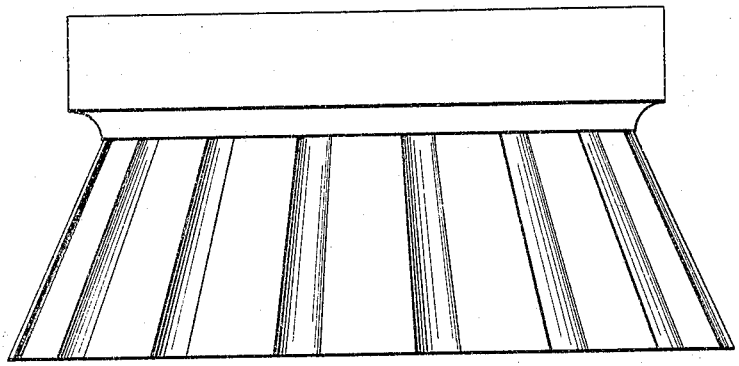
Figure 11:
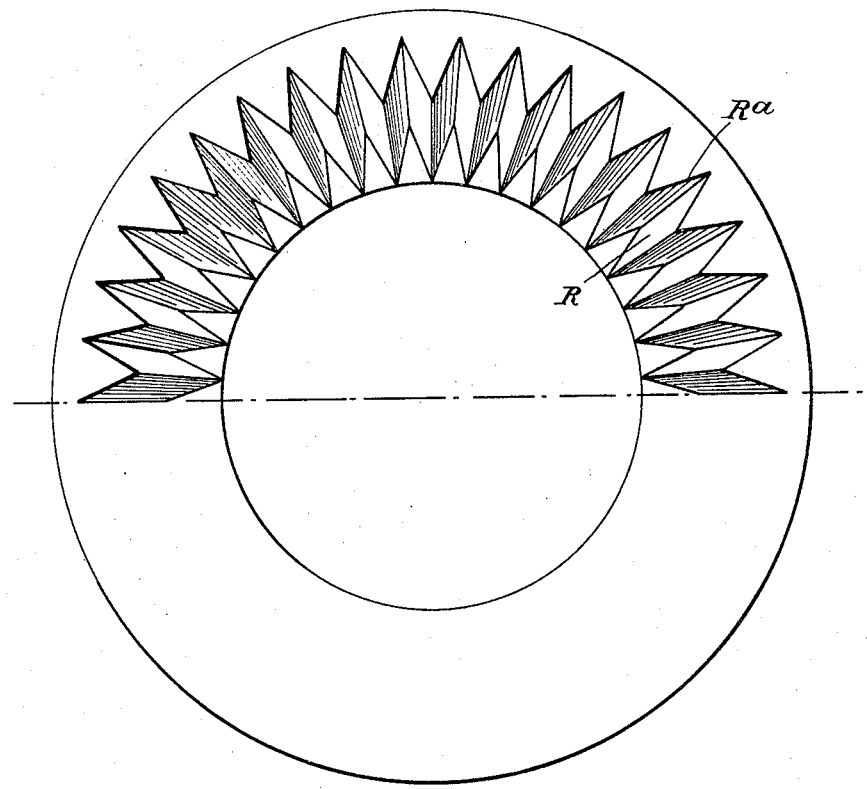
Figure 10:
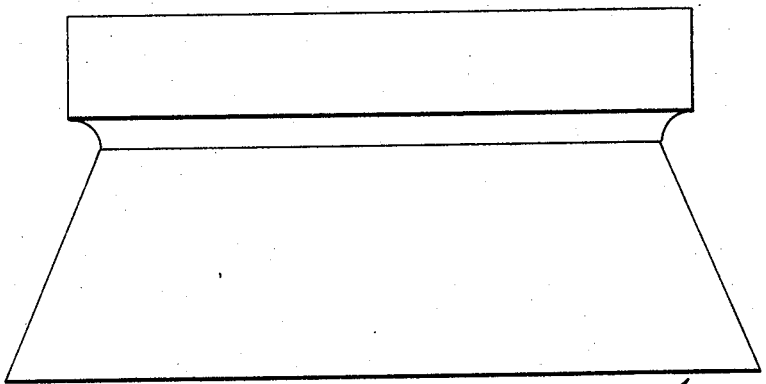

Figure 1 of the accompanying drawings represents, in elevation and partly in section, rotary cutters constructed and mounted so that they can be applied according to my invention. Fig. 2 is a plan of bar E', Fig. 1, with a part broken away and showing the middle telescopic holder in cross-section. Fig. 3 is a transverse section, drawn to a larger scale, on the line 3 3, Fig. 1. Fig. 3$^A$ is an enlarged sectional view of one of the cutters and its carrier. Figs. 3$^B$ and 3$^C$, 3$^D$ and 3$^E$ are enlarged details, as hereinafter described. Figs. 4 to 11 illustrate various forms of hollow cutters according to my invention. All these cutters have in common the features that they consist of hollow circular body parts with an external periphery adapted to break away the required depth from the face of the stone or the like and with an annular face at right angles to the axis of the cutter and that this annular face is provided with recesses penetrating the annulus, so as to afford cutting edges in the annulus and outlets for grit and spaces for the admission of water to keep the tool and work cool. Figs. 4 and 5 represent in elevation and face view, respectively, a hollow rotary cutter having externally and internally V-shaped teeth with scraping edges. Figs. 6 and 7 are similar views representing a hollow rotary cutter having externally and internally curved teeth with scraping edges. Figs. 8 and 9 are similar views representing a hollow rotary cutter having external and internal teeth curved circumferentially and with U-shaped spaces between the teeth having straight scraping edges. Figs. 10 and 11 are similar views representing a hollow cutter without teeth externally, but having internal V-shaped spaces all round forming teeth with scraping edges.

The cutters represented in Figs. 4 to 11, inclusive, are examples of cutters which when attached to the carrier (shown in Figs. 1 and 3) and applied as hereinafter described will, while taking a heavy cut off the face of a hard gritty sandstone, produce at the same time a smooth even surface on the stone. Of course I do not limit myself to the particular forms shown of either the external or internal teeth on the said cutters.

The hollow cutters shown in Figs. 4 to 11 are of conical form, and when in use the larger diameter or base of the cone is in contact with the stone being operated on. The said cutters have in every case teeth which may extend the whole distance between the two diameters of the cone or from the larger diameter or base to only a part of the way toward the smaller diameter, the teeth being preferably of even pitch, the pitch of course becoming less toward the smaller diameter, there being also a disk, web, or flange at or near the smaller end, at which smaller end it is screw-threaded or otherwise provided with means of attachment to a carrier.

In Fig. 1 rotating molding-cutters (such as shown in Fig. 10 of my British patent, dated February 21, 1898, No. 4,328) are shown in combination with rotating hollow cutters, such as shown in Figs. 4 to 11, the holders of which cutters are adjustable on a bar E', which can be rapidly reciprocated in any suitable manner. The body $a$ (see Fig. 2) of each holder for the toothed hollow cutters is cylindrical and has flanges $b$ and $c$ on either side and $d$ on one end, (see Fig. 1,) by means of which latter and bolts $e$ the said holders can be adjusted on and fixed by nuts $h$ $h$ and $h'$ on the screwed rods $h^2$ at any desired part of the bar E'. The flanges $b$ have a space between them, (see Fig. 2,) so that by screwing up the nuts $h$ the diameter of the cylinder can be contracted onto a body $f$, which body when the nuts $h$ are slackened can be moved outward and inward in the body $a$ by means of a screw $g$ (see Figs. 2 and 3) and be fixed in any required position by tightening the said nuts $h$ $h'$. The body $f$ is preferably hollow for the sake of lightness, and to its outer end is attached, so as to be capable of adjustment axially, a piece $i$, Fig. 3, to which is pivoted a socket $j$, the pivot of which socket passes through a flange $k$ on the piece $i$ and has screwed to its outer end nuts $m$ and $n$, by which the socket can be held in any desired angular position. One face of the socket $j$ bears against the flange $k$, and another surface of the socket $j$ bears on the surface $l$ of the piece $i$, so that when the nuts $m$ and $n$ are screwed up the socket $j$ will be immovable. In the socket $j$ is secured by a cotter $p'$ a tapered plug or pin $p$, on which is mounted so as to turn freely a carrier $q$, to which the cutter $v$ is secured. The nuts $m$ and $n$, by which the socket $j$ is secured to the piece $i$, have right and left handed screw-threads to act as jam-nuts, so that whatever side of the cutter may be acting on the stone the strain on the cutter tends to tighten the nuts, the socket $j$ remaining immovable from the angle at which it is set, and by reason of the swiveling adjustment of the piece $i$ and socket $j$ and the telescopic adjustment of the body $f$ within the body $a$, together with the movability of the body $a$ along the bar E', a cutter attached to the carrier $q$ can rotate at any angle or in any desired position within the range of movement. Between the carrier $q$ and face $o$ of the socket $j$ an adjustable liner $r$ is interposed, which liner fits over steadying-pins $t^2$, Fig. 3$^D$, so as to be immovable circumferentially and so that by introducing thin liners the pin $p$ when fixed to the socket $j$ and the carrier $q$ is bearing on the tapered body of the pin $p$ the fit is such that there is no slackness in the carrier $q$, while it is free to rotate.

In order to prevent rise in the temperature of the working parts, water is led through passages in the pin $p$ and in the socket $j$. When the pin $p$ is fixed to the socket $j$, the connecting-piece $p^2$ is inserted in the water-inlet passage $p^3$ in the said socket and secured therein by the nut $p^4$, so that when a water-pipe is connected to the piece $p^2$—as shown, for instance, at $p^5$—and water turned on the water will pass through the passage in the pin $p$ in the directions indicated by the arrows and be projected circumferentially through openings $p^8$ around the stem of a washer or disk $p^6$, secured to the tapered pin $p$, the angle of projection of the water corresponding to the angle of the beveled edge of the said washer or disk, as shown in the enlarged section, Fig. 3$^D$. The water thus passing through maintains an even temperature in the working parts and prevents expansion of the metals from heat which would otherwise be generated by friction, and consequently the rigidity in the parts is maintained, while when force is applied, as by the cutter being moved against a stone, the cutter, with its carrier $q$, will rotate freely on the pin $p$.

To maintain the lubrication of the tapered pin $p$, spaces between webs $q^2$, that extend along the exterior of the carrier $q$ from the lower to the upper flange, are inclosed by covers $s$, as shown in the enlarged vertical section, Fig. 3$^B$, (at right angles to Fig. 3$^A$,) and in horizontal section in Fig. 3$^C$. Chambers for oil or other suitable lubricant are thus formed, the lubrication being supplied at $s^2$ and passing through holes in the body of $q$, the said holes $s^3$ communicating with ordinary distributing-grooves in the inner surface of the carrier next to the tapered surface of the pin $p$, so that the lubricant is spread over the tapered surface of the pin $p$ as the carrier $q$ rotates thereon.

The face of the carrier $q$, which bears against the liner $r$, has an annular groove $t$, (see Fig. 3$^A$,) and on the contiguous face of the liner $r$, Fig. 3, there is a projecting taper ring which enters the said groove, there being a free space between the sides of the said groove and the ring to contain a thick lubricant, such as solidified oil or tallow, the natural solidity of the lubricant being maintained by the cooling effect of the water constantly passing, as before described, so that the lubricant forms a wall which prevents the admission of grit.

Lubricant for the upper face of the liner $r$ is contained in a vessel, such as $u$, secured to the socket $j$ and communicating by a passage $u'$ with grooves between the liner and the contiguous face of the socket $j$. The vessel $u$ can be adjusted so as to maintain it vertical at whatever angle the socket $j$ may be fixed. The cutter $v$ is shown as being screwed onto a projecting part of the carrier $q$ and is prevented from turning on the carrier by stopper pins or screws. It may, however, be fixed to the carrier in any other suitable way. The bearing-surface of the tapered pin $p$ extends to near the outer end of the carrier $q$, which outer end has secured thereto a collar $p^7$, which covers the junction between the carrier $q$ and the pin $p$. An annular rib is formed either on the end of the carrier or on the collar $p^7$, Fig. 3$^E$, inward of the circumference of the pin $p$ to engage in a groove formed in the collar or in the end of the carrier, as the case may be, the space between the rib and the groove being filled with solidified oil or tallow in the manner before described with reference to the face of carrier $q$ to prevent the entrance of grit to the bearing-surfaces and prevent the escape of oil from between the pin $p$ and carrier $q$.

I will now describe the action of cutters worked according to my invention, although, of course, they need not be used in the position which is merely given as an example. Suppose the before-described attachments are applied in the machine described in the specification of my British Letters Patent No. 7,520, of 1899, and that the machine is in action and a gritty sandstone is being operated upon, it being fixed in such a position on the table as to be traversed under the cutter while the said cutter is being carried to and fro with its finishing-face level, and supposing the cutter used to be such as that represented in Fig. 9, for example, and that water be allowed to pass through the disperser toward the whole circumference of the cutter. Then by setting the intermittent feed mechanism so that the table carrying the stone will be moved toward the cutter at the end of each stroke the teeth of the cutter will enter the stone and break off parts of its upper surface and produce a smooth plane surface on the stone as the work proceeds without bruising the finished face of the stone, the following actions taking place simultaneously—namely, there is a disintegrating action of the teeth, the wedging action of the sloping rim of the cutter, the scraping action of all the external and internal edges across the face of the rim of the cutter, and the action of the water which is playing constantly on the cutter and the stone. The water instantly removes the grit from the path of the scraping edges of the cutter and moistens the stone and also keeps the cutter cool while it is in action even at a very high rate of speed. Before the whole diameter of the cutter is on the stone the water clears the grit out of the path of the cutter and generally sweeps all debris before it, and when the whole diameter of the cutter is upon the stone all outward matter is removed by the cutter itself coming in contact with such outward matter while the cutter is being carried to and fro. The particles of grit that are gathered inside the cutter during each stroke are completely discharged by the water at the end of each stroke when the cutter leaves the stone. When the cutters, Figs. 4 to 11, are carried to and fro or are carried continuously—as, for instance, in a circular line—and their edges are brought in contact with the stone, then, because there is a retarding effect at the edges of the cutters while their centers are in motion, the cutters are rotated, with the result before described. Again, when the centers of these cutters are not in motion they can be rotated by bringing stone in motion in contact with their edges. Similar results are obtained whether the feeding of the stone be continuous throughout each stroke of the cutters or intermittent at the end of each stroke or at regular or irregular intervals during the strokes. A cast-iron hollow cutter such as described will, owing to the combined actions described, retain its efficiency for a lengthened period. With some stones there is practically no wear on the cutter, while with some stone there is considerable wear of the cutter; but as the scraping edges $R^a$ in the annular face of the cutter are constantly working not only in circular lines, but to and fro across the face of the stone, an even smooth surface is produced, the efficiency of the cutter being maintained, as any wear that takes place in the cutter maintains the sharpness of the cutting and scraping edges. The same kind of cutters with the same connections can be used to produce tooled surfaces on stone, provided the faces of the cutters be angled to the face of the stone by angularly adjusting the socket $j$ and fixing it in its adjusted position.

The sides of the stone can be dressed without turning the stone on its support by turning the socket $j$ on its pivot until the face of the cutter is vertical and then fixing it in that position, the cutter being fed downward while it is carried to and fro. In this manner several stones can be dressed simultaneously by attaching a cutter to each of the holders $a$ illustrated without changing the position of the stone on the table and simply changing the line of action of the cutters, as described.

When for any reason the water is not required to play all round the circumference of the cutter, a washer of suitable material having openings where desired can be placed between the edge of the disperser and the pin $p$, so as to cause the water to be shut off from any desired point or points. Hollow rotary cutters without external teeth, but having internally spaces R and scraping edges $R^a$, such as those shown in Figs. 5, 7, 9, and 11, can be used with advantage for producing smooth surfaces.

The telescopic holders illustrated in Figs. 1, 2, and 3 permit of variations in the height of the cutters, so that several stones of different heights can be dressed simultaneously or the cutters can be caused to act on different levels on one stone; but for work where no material difference of levels is required the socket in which the piece $i$, Figs. 1 and 3, is screwed can be close up to the bar E′ and the bar E′ can be raised and lowered in the main vertical slides as desired and traversed to and fro in the manner described.

Referring again to Figs. 1, 2, and 3, arranged between the bodies $a$ of the telescopic holders are rotary cutters such as are described in the specification of my British Patent No. 3,828, of 1898, the said cutters being mounted on spindles $A^3$, carried in holders A, which can be slid upward or down with or without the aid of screws and which in the case illustrated by way of example can be fixed at any point within their range of travel by means of nuts $A'$. The bars $A^3$, which are shown by dotted lines in Fig. 1, are formed at each end with a journal, so that when they are shipped into their respective seats $A^4$ and the cotters $A^5$ are tightly in position the bars $A^3$ are securely fixed, so that each of these bars and each pair of holders become practically one. Over each bar $A^3$ there is placed a sleeve $A^6$, onto which the circular cutters are mounted, the sleeve $A^6$ rotating freely on the bar without slackness, the fit endwise being adjusted by means of nuts $A^7$.

When the cutters and spacing-washers used are collectively of the same length as the bar, the before-described nuts $A^7$, securing the sleeve endwise, may be of a size to also hold the cutters and washers in position, and when they are of different lengths the cutters and washers are held together by the nuts $A^9$, which work on screw-threads at one end of the sleeve and press the cutters, with any spacing-washers $A^8$ they may have between them, against the collar $A^{10}$ on the sleeve.

Having now particularly described and ascertained the nature of this invention and in what manner the same is to be performed, I declare that what I claim is—

1. For use in apparatus for cutting or dressing stone or like material, a cutter consisting of a hollow circular body having an external periphery adapted to break away the required depth from the face of the stone or like material, said cutter also having a flat annular face at right angles to the axis of the cutter and recesses penetrating the annulus so as to afford cutting edges in the annulus and outlets for grit and spaces for the admission of water as hereinbefore explained.

2. For use in apparatus for cutting or dressing stone or like material, a cutter consisting of a hollow circular body part with a flat annular face at right angles to the axis of the cutter and with recesses penetrating the annulus from the inner circumference, in combination with means for admitting water to the interior of the cutter, substantially as hereinbefore described.

3. In apparatus for cutting or dressing stone or like material, a circular hollow cutter provided with an annular face at right angles to the axis of the cutter and with recesses penetrating the annulus, a carrier to which the cutter is secured, a non-rotatable tapered pin upon which the carrier is rotatably mounted, and a holder to which the pin is secured.

4. In apparatus for cutting or dressing stone or like material, a circular hollow cutter provided with an annular face at right angles to the axis of the cutter and with recesses penetrating the annulus, the said cutter being connected to a carrier mounted and rotatable upon a tapered pin and provided with a chamber or chambers for lubricant and with passages from the said chamber or chambers to the bearing between the said carrier and tapered pin, substantially as hereinbefore described.

5. In apparatus for cutting or dressing stone or like material, a circular hollow cutter provided with an annular face at right angles to the axis of the cutter and with recesses penetrating the annulus, the said cutter being connected to a carrier mounted and rotatable upon a support having a passage through it communicating with the interior of the cutter and means for supplying water through the said passage to the interior of the cutter, substantially as hereinbefore described.

6. In apparatus for cutting or dressing stone or like material, a circular hollow cutter provided with an annular face at right angles to the axis of the cutter and with recesses penetrating the annulus, the said cutter being connected to a carrier mounted and rotatable upon a support having a passage through it communicating with the interior of the cutter and a water-dispersing washer, or disk, at the outlet of the said passage to the interior of the cutter, and means for supplying water through the said passage, substantially as hereinbefore described.

7. In apparatus for cutting or dressing stone or like material, a circular hollow cutter provided with an annular face at right angles to the axis of the cutter and with recesses penetrating the annulus and a support or holder upon which it is rotatably mounted, in combination with a ridge on the one part, a groove on the other part larger than the ridge, the said groove receiving lubricant, such as solidified oil or tallow, and excluding grit from the bearing-surfaces, substantially as hereinbefore described.

8. In apparatus for cutting or dressing stone or like material, a circular hollow cutter provided with an annular face at right angles to the axis of the cutter and with recesses penetrating the annulus, the said cutter being carried by a carrier mounted and rotatable upon a conical pin secured to a holder with washers arranged between the said carrier and holder, substantially as hereinbefore described.

9. In apparatus for cutting or dressing stone or like material, a circular hollow cutter provided with an annular face at right angles to the axis of the cutter and with recesses penetrating the annulus, the said cutter being connected to a carrier, a swiveling support or holder, means for adjusting the carrier so as to insure free action without slackness, means for supplying lubricant through the swiveling support or holder to the face of the carrier, means for supplying lubricant and forming an oil-bath for the inner surface of the carrier and the pin on which it rotates, and means for supplying water to the interior, substantially as hereinbefore described.

In testimony whereof I affix my signature in presence of two witnesses.

FARQUHAR MATHESON McLARTY.

Witnesses:
WILLIAM GERALD REYNOLDS,
HENRY DENIS HOSKINS.